United States Patent
Lin et al.

(10) Patent No.: US 10,542,594 B2
(45) Date of Patent: Jan. 21, 2020

(54) DIRECT AC DRIVING CIRCUIT AND LUMINAIRE

(71) Applicants: TRIDONIC GMBH & CO KG, Dornbirn (AT); TRIDONIC JENNERSDORF GMBH, Jennersdorf (AT)

(72) Inventors: Quentin Lin, Shenzhen Guangdon (CN); Istvan Bakk, Torokbalint (HU)

(73) Assignees: TRIDONIC GMBH & CO KG, Dornbirn (AT); TRIDONIC JENNERSDORF GMBH, Jennersdorf (AT)

( * ) Notice: Subject to any disclaimer, the term of this patent is extended or adjusted under 35 U.S.C. 154(b) by 0 days.

(21) Appl. No.: 15/744,110

(22) PCT Filed: Jul. 30, 2015

(86) PCT No.: PCT/CN2015/085597
§ 371 (c)(1),
(2) Date: Jan. 12, 2018

(87) PCT Pub. No.: WO2017/015964
PCT Pub. Date: Feb. 2, 2017

(65) Prior Publication Data
US 2018/0213620 A1 Jul. 26, 2018

(51) Int. Cl.
*H05B 33/08* (2006.01)
*H05B 37/02* (2006.01)

(52) U.S. Cl.
CPC ....... *H05B 33/0815* (2013.01); *H05B 33/083* (2013.01)

(58) Field of Classification Search
CPC .. H05B 33/08; H05B 33/0815; H05B 33/083; H05B 37/02; H05B 33/0824; H05B 33/0827
See application file for complete search history.

(56) References Cited

U.S. PATENT DOCUMENTS

| 7,936,135 B2 * | 5/2011 | Hum | H05B 33/0815 |
| | | | 315/307 |
| 2013/0049618 A1 * | 2/2013 | Radermacher | H02M 1/08 |
| | | | 315/200 R |
| 2014/0184077 A1 | 7/2014 | Lee et al. | |

FOREIGN PATENT DOCUMENTS

| CN | 101858525 | 10/2010 |
| CN | 201898641 | 7/2011 |

(Continued)

OTHER PUBLICATIONS

International Search Report and Written Opinion in parent PCT Application PCT/CN2015/085597 dated Apr. 28, 2016.

*Primary Examiner* — Thai Pham
(74) *Attorney, Agent, or Firm* — Andrus Intellectual Property Law

(57) ABSTRACT

The invention relates to a direct AC driving circuit and a luminaire for driving at least one LED, the driving circuit comprises a LED string (2) that comprises a series connection of at least two LEDs, wherein the LED string (2) is directly powered from a rectified AC mains voltage and a LED string switching unit (1) that is configured to control at least one LED shortening unit (1') that is arranged in parallel to at least one LED of the LED string (2'). According to the invention, the driving circuit comprises means configured to provide a low supply voltage ($V_{Low}$) which is also derived from the rectified AC mains voltage (4), wherein the low supply voltage ($V_{Low}$) is generated from unutilized voltage of the LED-string (2').

17 Claims, 14 Drawing Sheets

(56) References Cited

FOREIGN PATENT DOCUMENTS

| | | |
|---|---|---|
| CN | 102244955 | 11/2011 |
| CN | 103517497 | 1/2014 |
| WO | 2011141856 | 11/2011 |
| WO | 2015050349 | 9/2015 |

* cited by examiner

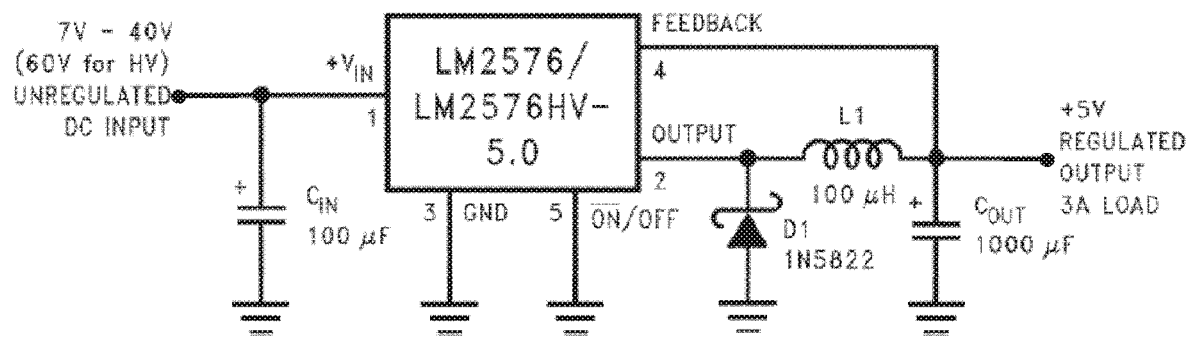
Fig. 15 - Prior Art

DIRECT AC DRIVING CIRCUIT AND LUMINAIRE

CROSS REFERENCE TO RELATED APPLICATION

The present application is the U.S. national stage application of International Application PCT/CN2015/085597, filed Jul. 30, 2015, which international application was published on Feb. 2, 2017 as International Publication WO 2017/015964 A1.

TECHNICAL FIELD OF THE INVENTION

The invention relates to a direct AC driving circuit for driving at least one LED. The invention further relates to a luminaire for emitting light and a lighting system for buildings.

BACKGROUND OF THE INVENTION

Light-emitting diodes, short LEDs, are an important class of solid-stated devices that convert electric energy to light. LEDs are attractive candidates for replacing conventional light sources such as incandescent and fluorescent lamps. LEDs typically have substantially higher light conversion efficiencies than incandescent lamps, and have longer lifetimes than conventional light sources. Some types of LEDs have higher conversion efficiencies than fluorescent light sources.

The conversion efficiency of individual LEDs is an important factor in addressing the cost of LED light sources. The conversion efficiency of an LED is defined to be the electrical power dissipated per unit of light that is emitted by the LED. Electrical power that is not converted into light is mainly converted into heat that raises the temperature of the LED. The light conversion efficiency of an LED decreases with increasing current through the LED.

LEDs are typically powered from a direct current, short DC, power source or a modulated square wave source so that a constant current flows through the LED while the LED is in the ON-state. The current value is set to provide high conversion efficiency. In the light sources with variable intensity, the intensity of the light is controlled by changing the duty factor of a modulated square wave so that the current flowing through the LED is at a value consistent with providing the desired efficiency. Such a modulated square wave form is hereinafter referred to as pulse-width-modulated signal, short PWM-signal.

Conventional light systems for use in buildings typically are powered from an alternating current, short "AC, power source". Thus, a LED-based luminaire typically includes an AC/DC power conversion means. The cost of such an AC/DC power conversion means represents a significant fraction of the cost of a typically LED luminaire. In addition, the power losses in the power converter reduce the overall efficiency of the light source. In addition, such AC/DC converters are not as reliable as that of LEDs and hence, can limit the lifetime of the lighting system.

To avoid unnecessary costs and increase the power efficiency, LED luminaires have been proposed that operate directly from an AC power source without the power first being converted to DC. For example, LED luminaires that include two LED-strings of series-connected LEDs have been proposed. The one LED-string is powered on when the AC waveform is in the positive half of the sine wave, and the other LED-string is powered when the negative half of the sine wave. This simple driving scheme suffers from low efficiency and flickering. To improve the efficiency, luminaires that include a full wave rectifier have been proposed.

To accommodate the voltage of a typical building power source, hereinafter referred to as AC main voltage $V_{mains}$, a number of LEDs might be connected in a series to build an LED-string. A typical effective mains voltage in Europe is 230 Volts or in USA 110 Volts. In case the US mains voltage $V_{mains}$ is applied, the respective peak voltage is 156 Volts. Thus, approximately 43 LEDs are needed that must be placed in series to withstand this peak voltage. However, the LED-string will cease to make light when the voltage drops to 118 Volts. As a result, light is only generated in approximately 30 Percent of the time.

In prior art document U.S. Pat. No. 7,936,135 B2 a reconfigurable LED array and lighting system is described, in which each LED in a series string is connected in parallel with a switch that shorts that LED, when the AC voltage across the string is insufficient to drive all of the LEDs in the LED string. By removing LEDs from the LED string, when the AC voltage is below the voltage needed to drive all of the LEDs, the duty cycle is substantially increased. However, the resulting light intensity varies approximately sinusoidal. In addition, the light source will still cease to make light when the AC voltage falls below a forward voltage $V_f$. This leads to an average number of LEDs that generates light over the cycle of the AC mains voltage which is still substantially less than one hundred Percent. Finally, the costs of the luminaire are increased by the number of switches needed to implement such a scheme.

In nowadays lighting systems a lot of additional functionality is needed. For instance, an active sensing element, such as a motion sensor or an corridor function or an actor, such as a door opener, or an air-fan are installed in the lighting systems of a building to increase the functionality of the lighting system. Additionally, control systems in a lighting system, such as multi-point control units or dimming arrangements or communication units are applied in the building systems to increase its functionality. Those additional functions need a power supply.

Thus, it is an objective to provide a direct AC driving circuit for an LED that avoids the above-identified drawbacks. Especially, the energy efficiency of an LED luminaire should be increased and the costs should be reduced. The provision of a low voltage supply for increasing the functionality of the lighting system should be obtained without decreasing the energy efficiency or increasing the costs of the lighting system.

SUMMARY OF THE INVENTION

According to a first aspect of the invention, a direct AC driving circuit for driving at least one LED is provided. The driving circuit comprises a LED string that comprises a series connection of at least two LEDs, wherein the LED string is directly powered from a rectified AC mains voltage. The driving circuit further comprises a LED string switching unit that is configured to control at least one LED shorting unit that is arranged in parallel to at least one LED of the LED string.

The rectified AC mains voltage is derived from a rectifying unit. The rectifying unit rectifies the applied AC mains voltage by means of a full wave rectifying circuit, such as a bridge rectifier, e.g. a Graetz bridge circuit or by a center tapped transformer and two rectifying diodes. Thus, the direct AC driving circuit comprises an AC input terminal on which an AC mains voltage is applicable. Such an AC mains voltage might be the buildings power source.

According to the invention, the driving circuit is configured to provide a low supply voltage that is also derived from the rectified AC mains voltage. The low supply voltage is significantly lower than the rectified AC mains voltage. The low supply voltage is generated from unutilized voltage of the LED-string.

The low output voltage has a value that is significantly lower than the rectified AC mains voltage, preferably within a ratio range of 1:200 to 1:50. Thus, typical low voltage values are—without limiting the scope of the invention—1.5 Volts, 3 Volts, 3.3 Volts or 5 Volts.

Consider a single LED that is driven by an AC waveform. In general, the LED is characterized by a turn-on voltage, $V_f$, which hereinafter is also referred to "forward voltage". This forward voltage $V_f$ must be exceeded to forward bias the LED so that a substantial current will flow through the LED. The LED will remain off until the sine wave reaches this forward voltage $V_f$. When the voltage is greater than this forward voltage, the LED will generate light. The forward voltage $V_f$ is mainly determined by the dominant wavelength of the emitting light.

However, the voltage drop across the LED must also be maintained below a damage voltage $V_d$, at which the LED might be destroyed or damaged. The damaging voltage $V_d$ is determined by the overall heat consumption the LED is capable of enduring or the highest current density allowed to the LED without causing long-term reliability issues.

In general, the current through the LED increases exponentially with voltage above the forward voltage $V_f$ until the current is limited by the series resistance of the LED. Hence, the difference between the forward voltage $V_f$ and the damage voltage $V_d$ characterizes an allowable operating voltage range of the LED. This operating voltage range is relatively small.

The minimum number of LED must be greater than the quotient of $V_{mains}/V_d$ to prevent damage to a single LED in the LED-string.

Thus, the term "unutilized voltage" preferably refers to a voltage value that is outside the normal LEDs operating voltage range. Thus, the unutilized voltage is a voltage that would have been unused and/or dissipated because the LED would not use it for the conversion of light from electrical energy. Since the electrical energy is now used as a low voltage supply, the unutilized voltage is not dissipated to heat. Thus, the electrical efficiency of the driving circuit is increased.

The unutilized voltage especially is a voltage below the forward voltage $V_f$ that needs to be exceeded to forward-bias the LED so that a substantial current will flow through the LED. The LED will remain off until the sine wave reaches this forward voltage $V_f$.

Additionally and/or alternatively, the unutilized voltage is also a voltage the damaging voltage $V_d$ at which the LED might be destroyed or damaged. The damaging voltage $V_d$ is determined by the overall heat consumption the LED is capable of enduring or the highest current density allowed to the LED without causing long-term reliability issues.

Additionally and/or alternatively, the unutilized voltage is a voltage value that is equal to an adaptive forward voltage of an LED string that differs due to the activation/deactivation of LEDs by means of the LED-shorting unit. In case, the LED-shorting unit activates a specific LED or a LED-substring, the forward voltage of the LED-string might change. Thus, the unutilized voltage value changes.

Thus, the low supply voltage is mainly generated from unused and/or dissipated AC mains voltage of the driving circuit that is above the damaging voltage and/or below the forward voltage of the LED-string.

Since the unutilized voltage is now used to provide the low voltage, the power losses in the driving circuit are heavily reduced and an additional low voltage power supply is provided. In case the load on the low supply voltage is proportional to the mains voltage and the LED-string voltage, the total harmonic distortion, short: THD, is also further reduced. This low supply voltage is independent on a dimming state of the direct AC driving circuit.

In a preferred embodiment the low supply voltage is generated from a voltage lower than a forward voltage of the LED-string. The forward voltage is the voltage value that is needed to turn-on the LED in a LED-string or LED-substring. The voltage below this value is unutilized voltage.

In a preferred embodiment the low supply voltage is provided by means of a capacitance, in particular a buffer capacitor, that is charged until the AC mains voltage reaches the forward voltage in the LED string. Thus, the low supply voltage is generated by energy that is not utilized in the AC driving circuit to emit light and thus, the power efficiency of the direct AC driving circuit is further increased.

In a preferred embodiment, the low supply voltage is provided by means of a capacitance, in particular a buffer capacitor, that is charged from mains voltage that exceeds a damaging voltage $V_d$. The damaging voltage $V_d$ is determined by the overall heat consumption the LED is capable of enduring or the highest current density allowed to the LED without causing long-term reliability issues. To avoid damage or a destruction of the LED-string, a current control circuit is normally used to regulate the current through the LED-string respectively. In case, the voltage exceeds the damage voltage, the energy is normally dissipated in a resistance element etc., which—in prior art solutions—decreases the efficiency of the direct AC driving circuit. This dissipated energy is now used to charge the capacitance in order to provide a low power voltage for subsequent modules or units.

Alternatively or additionally, the low supply voltage is provided by means of a capacitance, in particular a buffer capacitor that is between the forward voltage of a first LED-string and the forward voltage of a second LED-string in case the second LED-string is activated and/or deactivated by the LED-switching unit through the LED-shorting unit.

In a preferred embodiment, the low supply voltage is derived from a regulation means that is connected in series to the LED string and that is independent on the LED string switching unit and thus independent on switching activities from said LED-string switching unit.

In a preferred embodiment, the further regulation means is a further LED or a Zener diode on which the low voltage is derived from. These elements adjust the value of the low supply voltage. The use of the further regulation means leads to a usage of unutilized voltage as a low supply voltage and stabilization of the low supply voltage upon exceeding the forward voltage.

In a preferred embodiment, the further regulation means is a further LED-string, wherein the value of the low supply voltage is adjustable by the number of LEDs arranged in series in the further LED-string. As higher the number of LEDs in the further LED-string is as higher is the low voltage of the direct AC driving circuit.

Preferably the low supply voltage is provided by a low supply voltage circuit. This voltage supply circuit might contain said buffer capacitance and has further stabilization elements in order to avoid a ripple of the voltage.

In a preferred embodiment, the low supply voltage is derived from a current control unit that is used to adjust the current that flows through the LED string, such as a constant current source. This current control unit might be used to limit the voltage drop at the LED-string below the damaging voltage $V_d$. Such a current control unit might be a current regulation circuit that comprises a current control transistor and an adjustable preset voltage value in order to adjust the current that flows through the LED string. Such a current regulator is mainly used in such an AC driving unit to reduce or limit the value of current to avoid destruction or damage of the LEDs in the LED string. Advantageously, the energy efficiency of the direct AC driving circuit is highly increased in case the preset voltage value is additionally used to generate the low supply voltage.

In a preferred embodiment, the current control unit at least comprises a current control switch that is switched in dependence on the further regulation means, wherein a capacitor is arranged in parallel to the current control switch and wherein the capacitor is charged upon shortening of the current control switch. As a conclusion the capacitor is charged as soon as the regulation means starts to limit the current flow through the LED-string. Thus, no energy is dissipated.

In a preferred embodiment, the low supply voltage is fed to a buck regulator. The buck regulator is used to further stabilize the low supply voltage.

Preferably, the voltage value at which the current control unit switches-off is adjusted by the further regulation means. The further regulation means might be a further LED or Zener diode or might consist of a plurality of LEDs in series to build a further LED-string to obtain the desired low voltage value.

In a preferred embodiment, the LED string comprises a plurality of LEDs that are arranged in at least two LED sub-strings. Each LED-substring is connected in parallel to one specific LED shorting unit that is switched by the LED-string switching unit. The LED string can thus be built in highly individual manner. For instance, a series connection of specific number of LEDs can be used to obtain a LED sub-string. Additionally, a parallel connection or a combination of a series connection and parallel connection to obtain better electrical and stabilization functionality of a LED-substring can be provided. The number of LEDs per LED-substring is not limited herein. The LED-substrings can be built with identical or different numbers of LED in order to obtain different lighting conditions in the building. Each LED-substring is shortened by a LED-shortening unit that is arranged in parallel to the at least one LED-substring and that is controlled by the LED-string switching unit.

In a preferred embodiment, the low voltage supply is used to power subsequent units of the driving circuit, preferably an active sensor, such as a motion sensor or the like, or an active actor, such as an air-fan. Those subsequent modules need to be powered to provide additional functionality to the lighting system in a building. The low voltage to power those active devices is now advantageously directly derived from the direct AC mains voltage that has been rectified and is unutilized voltage. Thus, the power efficiency of the direct AC driving circuit is increased and power losses are reduced.

In a preferred embodiment, the low voltage supply is used to power the LED-string switching unit. Thus, no additional energy is required to drive the switching unit. The direct AC driving circuit is thus self-energy supplied.

Preferably the low voltage supply is used to supply a subsequent multi-point control unit, short MPU. This multipoint control unit might be used to send and/or receive lighting commands, such as DALI-commands, to the LED-string switching unit as control commands to activate and/or deactivate a specific LED-shorting circuit. Using the inventive direct AC driving circuit allows a powering of such an MPU without further power supplies.

In another preferred embodiment, the low voltage supply is used to supply a dimming control unit. The dimming unit and/or the MPU in a lighting system of a building are used to control the LED-shorting units of the LED, wherein the necessary low supply voltage is derived from the direct AC driving unit. For instance, the LED-shorting unit is used to provide a PWM-signal to the specific LED and/or LED-substring, wherein the duty cycle is adapted in view of the dimming command that is received from the dimming arrangement.

According to another aspect of the invention, a luminaire for emitting light is proposed. Therein the luminaire is built with at least one LED that is driven by a driving circuit according to the above-described manner. The luminaire is directly applied to an AC mains voltage.

According to another aspect of the invention, a lighting system for buildings is described. The lighting system at least comprises an active sensor, an actor and/or a multipoint control unit that is supplied by a low supply voltage derived from the driving circuit. The system might comprise a plurality of luminaires according to the above-described manner.

BRIEF DESCRIPTION OF THE DRAWINGS

FIG. 15 shows an embodiment of a buck regulator according to the prior art.

DETAILED DESCRIPTION OF THE PREFERRED EMBODIMENTS

Figure 1:
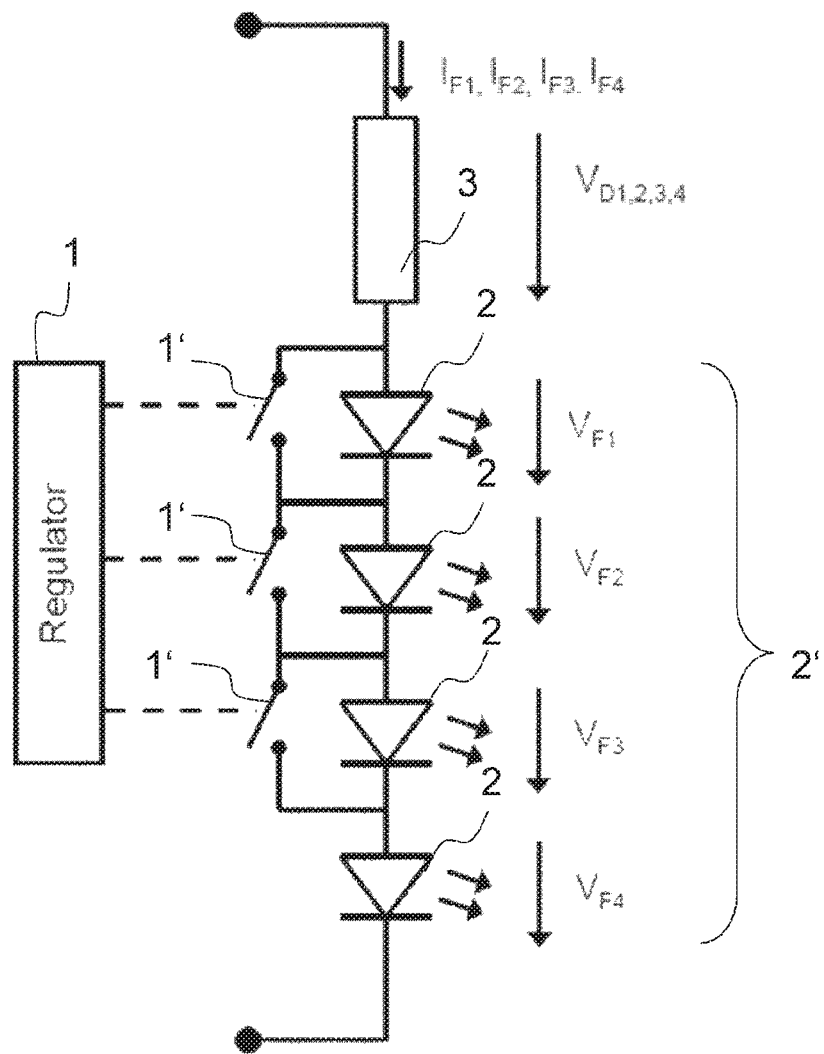
FIG. 1 shows an embodiment of a direct AC driving circuit according to the prior art.

Aspects of the present invention are described herein in the context of a driving circuit or a driving apparatus for driving at least one LED using an AC mains voltage.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an LED luminaire will be presented. However, as those skilled in the art will readily appreciate, these aspects may be extended to aspects of LED luminaires without departing from the invention. The LED luminaire may be used as conventional luminaires, including, by way of example, recessed light, surface-mounted lights, pendant lights, sconces, cove lights, track lighting, under-cabinet lights, landscape or outdoor lights, flood lights, search lights, street lights, strobe lights, bay lights, strip lights, industrial lights, emergency lights, balanced arm lights, accent lights, background lights or other light fixtures.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Now referring to FIG. 1, a direct AC driving circuit according to the prior art is shown. Therein a LED-string switching unit 1 is used to switch different parts of an LED-string 2'. The LED-string switching unit 1 is able to switch at least one LED shorting unit 1', which is arranged in parallel to an LED 2 of the LED-string 2'. Each LED 2 is characterized by a forward voltage $V_f$ which might be different to another forward voltage of another LED 2 also connected in series to the LED 2. A current control unit 3 is arranged in series connection to the LED 2. The current control unit 3 limits the current $I_f$ that is flowing through the LED-string 2'. For example, a current $I_f$ flowing from the input node of an AC driving unit to the LED-string 2' provides the LEDs 2 to lit, if the LED shortening unit 1' is switched by the LED-string switching unit 1 to an OFF state.

The LED shorting unit 1' thus comprises two operating modes, a conduction mode and a non-conduction mode. The LED-string switching unit 1 is configured to provide a switching signal to each LED-shorting unit 1' to change the operating mode of the LED-shorting unit 1'. Thus, the first three individual LED 2 in the LED-string 2' according to FIG. 1 can be shortened or not using the LED-shorting units 1'. The LED control signals are generated by the LED string control unit 1. For example, if the first switch l' is activated, the LED shortening unit 1' is closed, thus shortening the first LED 2 in the LED string 2'. The applied signal to the LED-string shorting unit 1' might be a PWM-signal, wherein the duty cycle of the PWM-signal adjusts the light intensity of the switched LED 2 according to dimming commands.

Figure 2:
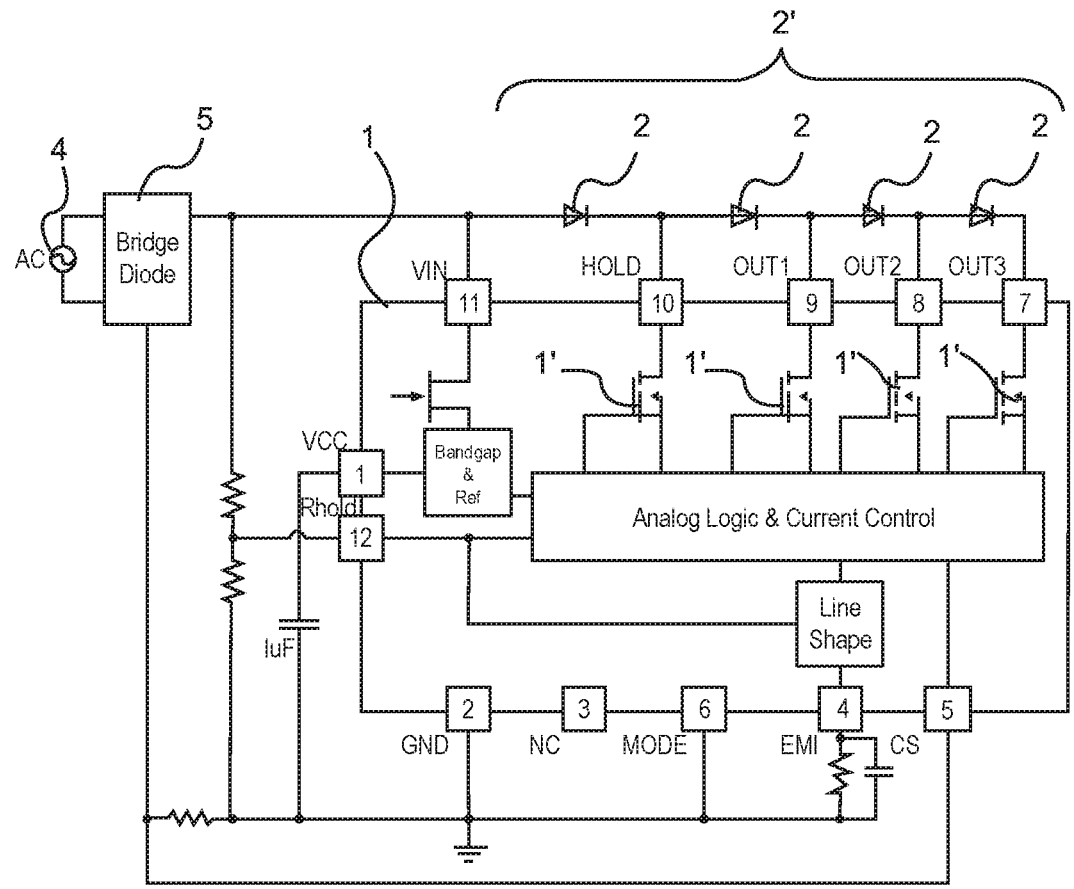
FIG. 2 shows another embodiment of a direct AC driving circuit according to the prior art.

Now referring to FIG. 2, another embodiment of an AC driving circuit for driving LEDs 2 according to the prior art is shown. Therein, an AC mains voltage 4 is provided to a rectifying unit 5. A LED string switching unit 1 is built as an integrated circuit device with 12 pins. According to FIG. 2, the internal of the IC device is shown. As can be derived from FIG. 2, the rectified mains voltage is applied to Pin 11. The IC device is fed with an effective AC mains voltage 4 of 230 Volts that provides an input current of 30 milliamperes. An analog logic & current control block in the LED string switching unit 1 is used to provide shorting signal to four different LED shortening units 1' in order to activate or deactivate the respective LED 2.

The embodiments according to FIG. 1 and FIG. 2 have the drawback that rectified AC mains voltage below a forward voltage $V_f$ or an adjustable forward voltage $V_{fx}$ are unutilized and the rectified AC mains voltage 4 is just dissipated. This leads to a waste of energy of the AC mains voltage 4.

Additionally, a current correction unit 3 is used in FIG. 1 and FIG. 2 to dissipate voltage above a damaging voltage $V_d$, in order to protect the LEDs 2 in the LED-string 2'.

Figure 3:
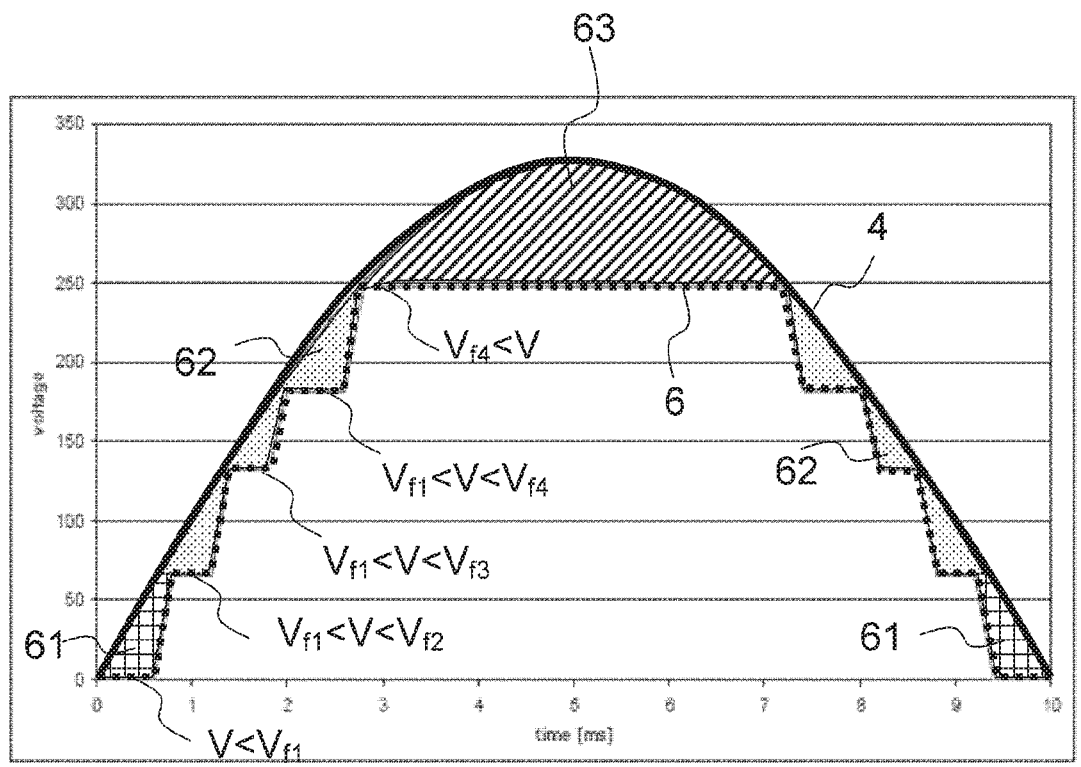
FIG. 3 shows a timing diagram of a positive sine wave of an AC mains voltage and the respective unutilized or dissipated voltage regions if using a direct AC driving unit according to the prior art.

FIG. 3 illustrates the positive half of a sine wave of an AC mains voltage 4 and the regulated voltage 6. The mains voltage 4 is a sine wave of 50 Hertz and an effective voltage of 230 Volts that leads to a peak voltage of approximately 325 Volts. This mains voltage values are an example of AC mains in Europe. This specific mains voltage $V_{mains}$ does not limit the scope of the invention.

The unutilized and/or dissipated voltage is shown in FIG. 3 in case a prior art direct AC driving unit according to FIG. 1 or FIG. 2 is used. A first region 61 illustrates unutilized voltage, which is wasted due to the fact that the LED-string 2' is not conducting until the mains voltage 4 reaches a forward voltage $V_{f1}$. Since a forward voltage $V_{f1}$ is necessary to provide a current flow through the LED-string 2', this energy is not used and thus dissipated. Since the energy in region 61 is simply wasted, the efficiency of the direct AC driving unit is heavily reduced.

Furthermore, another region 62 is shown, which illustrated the energy that is lost in accordance of each switching state in the LED-string 2', in dependence on the individual forward voltages $V_{f1}$, $V_{f2}$, $V_{f3}$, $V_{f4}$ of the individual LED 2. As can be derived from FIG. 3, three different stages exist in dependence on the activation state of the individual LED-shorting unit 1'.

Additionally, a third section 63 of unutilized voltage is shown. In this section 63, voltage is unutilized by the LED-string 2' since the use of a voltage higher than the sum of the four forward voltages $V_{f1}$, $V_{f2}$, $V_{f3}$, $V_{f4}$. According to the invention it is an objective to reduce or to avoid these unutilized voltages shown in regions 61, 62 and 63.

Figure 4:
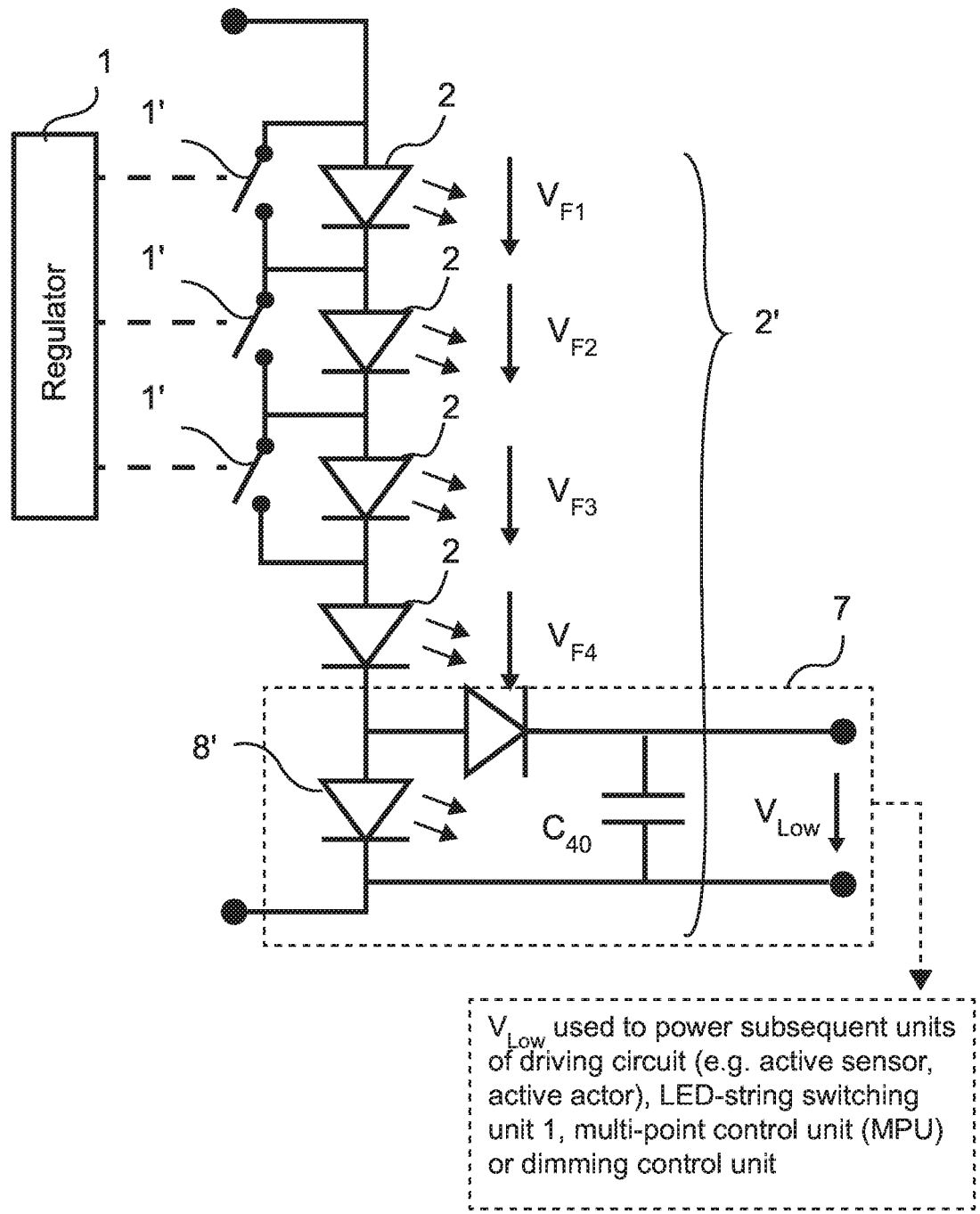
FIG. 4 shows a first exemplary embodiment of an AC driving unit according to the invention.

In FIG. 4 a first exemplary embodiment of a direct AC driving circuit according to the invention is shown. In contrast to FIG. 1 another LED 8' is provided as a further LED 8' that is connected in series to the existing LED string 2'. The further LED 8' is directly connected to a low voltage power supply 7 that comprises a forwarding diode and a buffer capacitance C40. The voltage $V_{low}$ across the buffer capacitance C40 can be provided to subsequent modules or units or can be used to drive the LED string control unit 1.

It should be noted, that the concept of having four series-connected LEDs 2 in a LED-string 2' can be extended to either more individual LEDs 2 or to a number of LED-substring 2" (not shown in FIG. 4) of LEDs 2 that are each connected in series, in parallel or series parallel combinations. The number of LEDs 2 in the LED-string 2' is thus dependent on the voltage value $V_{low}$ that has to be provided.

According to FIG. 4, the buffer capacitance C40 is charged until the first forwarding voltage $V_{f1}$ is reached. Thus, the charge that is included in the buffer capacitance C40 is not wasted and can now be used as a low voltage $V_{low}$ supply for subsequent modules. The forwarding diode in the circuit 7 avoids a discharge of the buffer capacitance C40 via the further diode 8'.

The forward voltage $V_{f1}$ of the further LED 8' can be adjusted according to requirements to the low voltage $V_{low}$. In case 3.3 Volts or 5 Volts as a low voltage $V_{low}$ is required, it is possible to use a series connection of several LEDs as a LED string 8'. For example, a series-connection of two LEDs 8' provide a typical voltage drop of 6.4 Volts. Alternatively, if 12 Volts are required, four LEDs 8' can be connected in series to provide the LED string 8' with a typical voltage drop of 12.8 Volts. This decreases the power loss significantly, since the unutilized voltage according to region 61 of FIG. 3 is now used to charge the buffer capacitance C40 and to provide a low voltage $V_{low}$. The further LED 8' can be replaced by a zener diode as another regulation means 8 in series to the LED string 2 to use the not utilized wasted energy. This provides an average current, which is lower than the LED-string 2' average current.

During operation the LED-string switching unit 1 allows three individual LEDs 2 to be turned on independently or at the same time based on the fluctuation of an AC mains voltage 4 or based on a control signal derived from a MPU (not shown) or based on a dimming command derived from a dimming unit (not shown).

Figure 5:
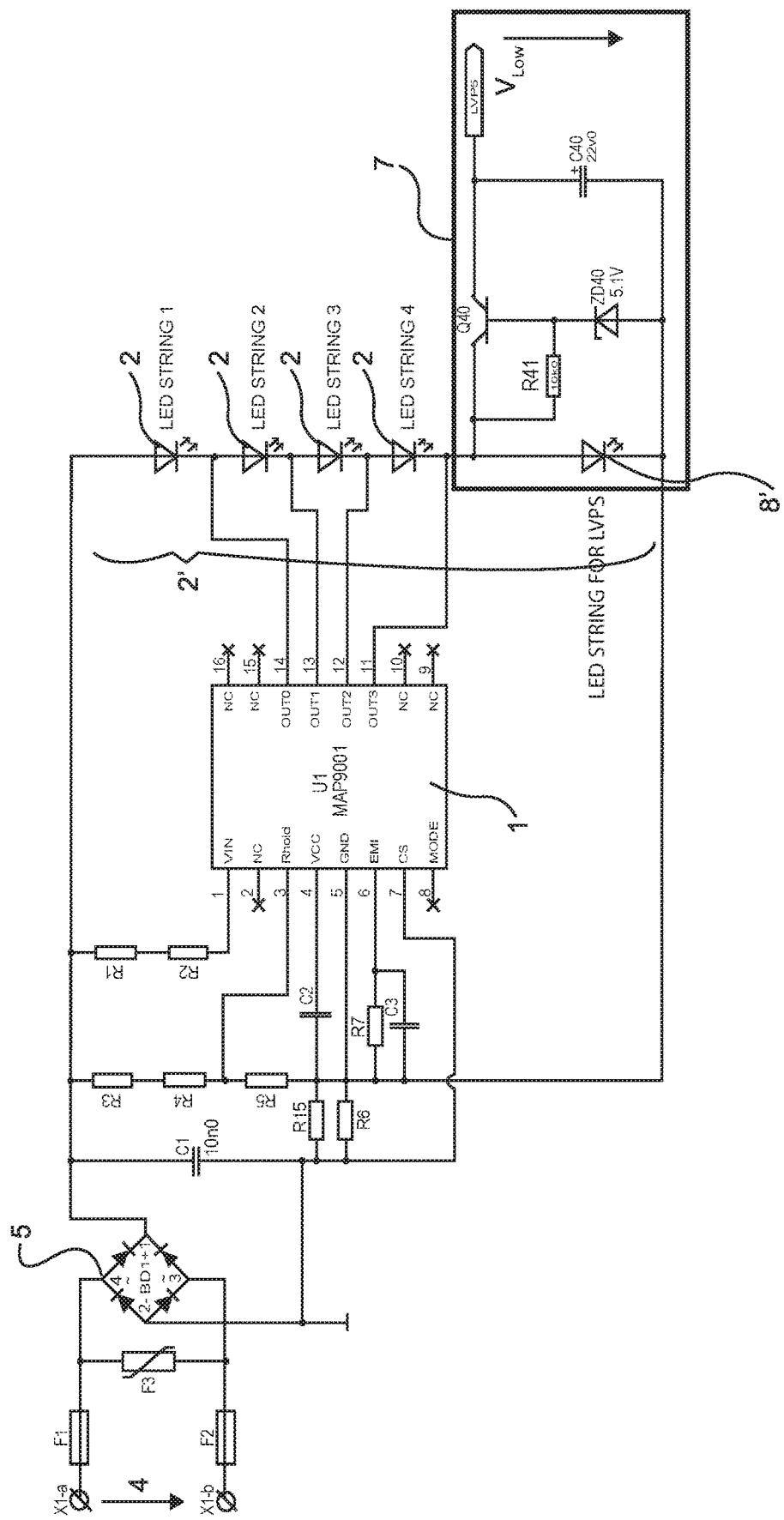
FIG. 5 shows a second exemplary embodiment of a direct AC driving unit according to the invention that comprises a first exemplary embodiment of a low supply voltage circuit according to the invention.

In FIG. 5 a second exemplary embodiment of a direct AC driving unit is shown. Therein the AC mains voltage 4 is applied at appropriate input terminals. A rectifying unit 5 provides the fully rectified AC mains voltage for directly powering the LED-string 2'. A further LED 8' is provided in series connection to the LED-string 2' to provide the low power voltage $V_{low}$. According to FIG. 5, an integrated circuit U1 is used to provide the LED-string switching unit 1 that is responsible for an appropriate shortening of the LEDs 2 in the LED-string 2'. The IC U1 is preset with resistors R1 to R7 and R15 as well as the capacitances C1 to C3.

According to FIG. 5 an inventive low voltage power supply 7 is used to provide the low voltage $V_{low}$. The voltage $V_{low}$ is provided via the buffer capacitance C40, which is charged whenever unused energy is provided until the forward voltage $V_f$ is reached in the LED-string 2'. Thus, no dissipated energy exists and the efficiency of the direct AC driving circuit is increased.

The low voltage power supply 7 is built with a transistor Q40 that is biased with a Zener diode ZD40 and an adjustment resistor R41.

Figure 6:
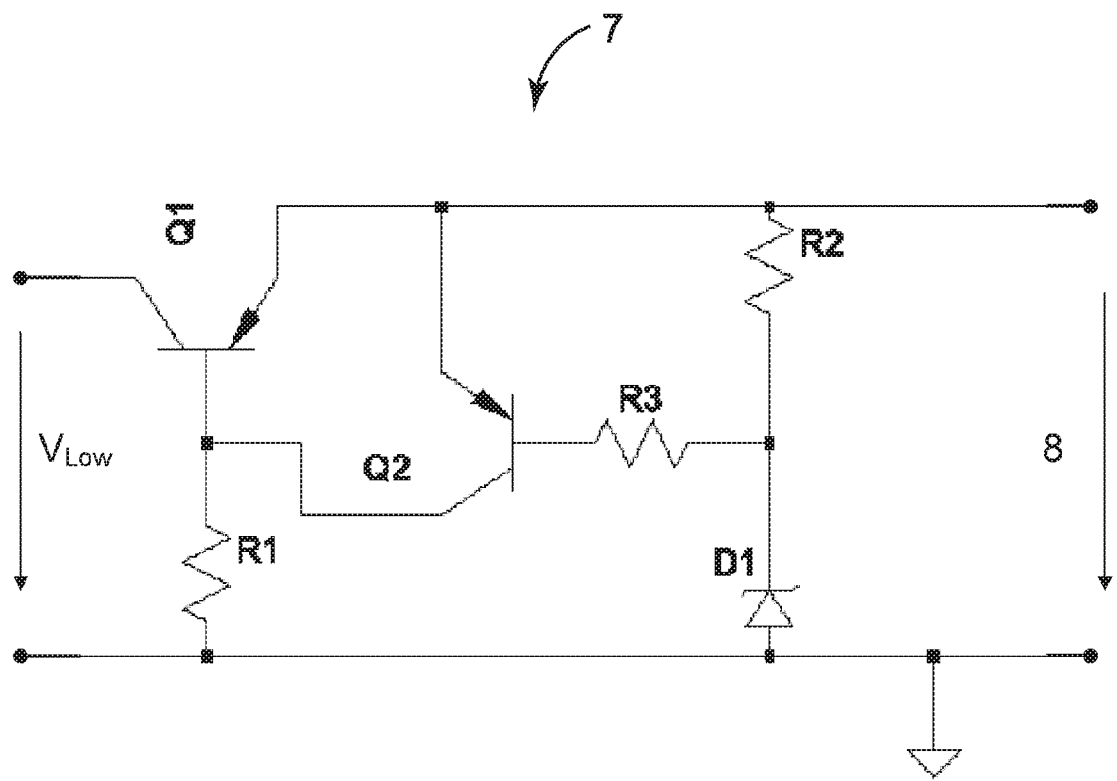
FIG. 6 shows a second exemplary embodiment of a low supply voltage circuit according to the invention.

In FIG. 6, another exemplary embodiment of a low voltage power supply 7 is shown. The circuit according to FIG. 6 comprises a first transistor Q1 and a second transistor Q2 that are biased with the voltage derived from the further regulation means 8 and the resistors R1 to R3. The voltage $V_{low}$ at the output of the low voltage power supply 7 is limited using the zener diode D1. The low voltage $V_{low}$ can be applied to a buck regulator as is shown in FIG. 15. It should be noted that the buffer capacitance C40 is not shown in FIG. 6.

Figure 7:
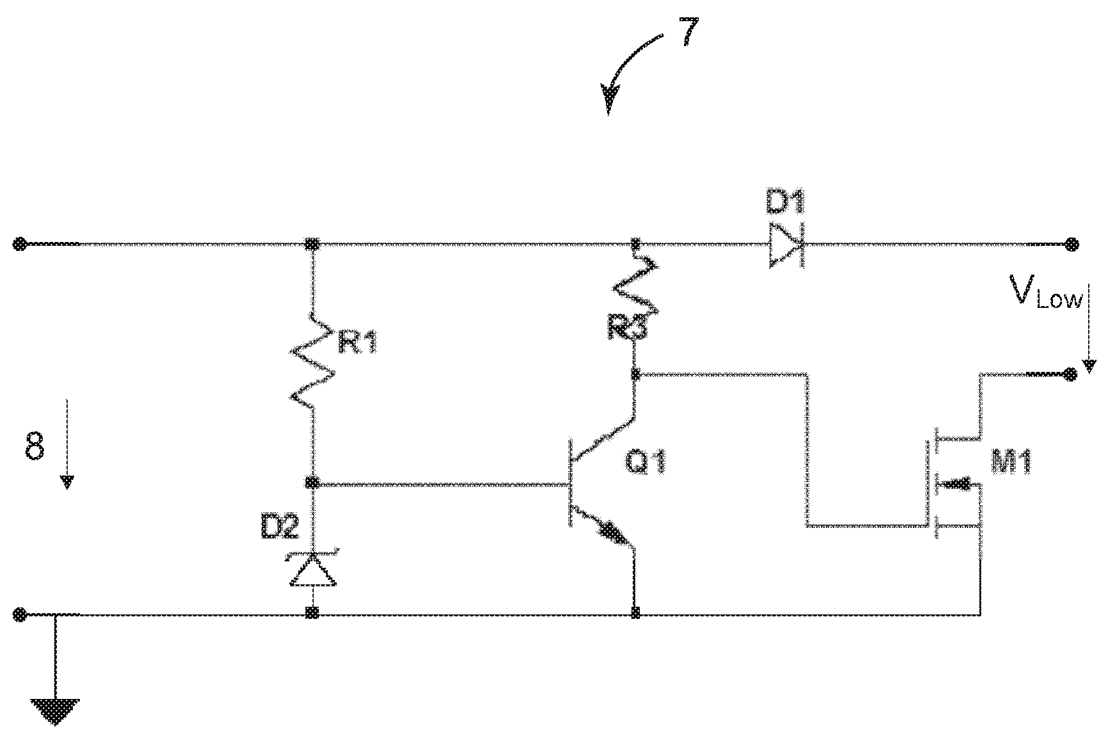
FIG. 7 shows a third exemplary embodiment of a low supply voltage circuit according to the invention.

In FIG. 7, another exemplary embodiment of a low voltage power supply circuit 7 is shown. This variant to FIG. 6 uses a MOSFET M1 to provide the low voltage $V_{low}$ for subsequent modules or units.

Figure 8:
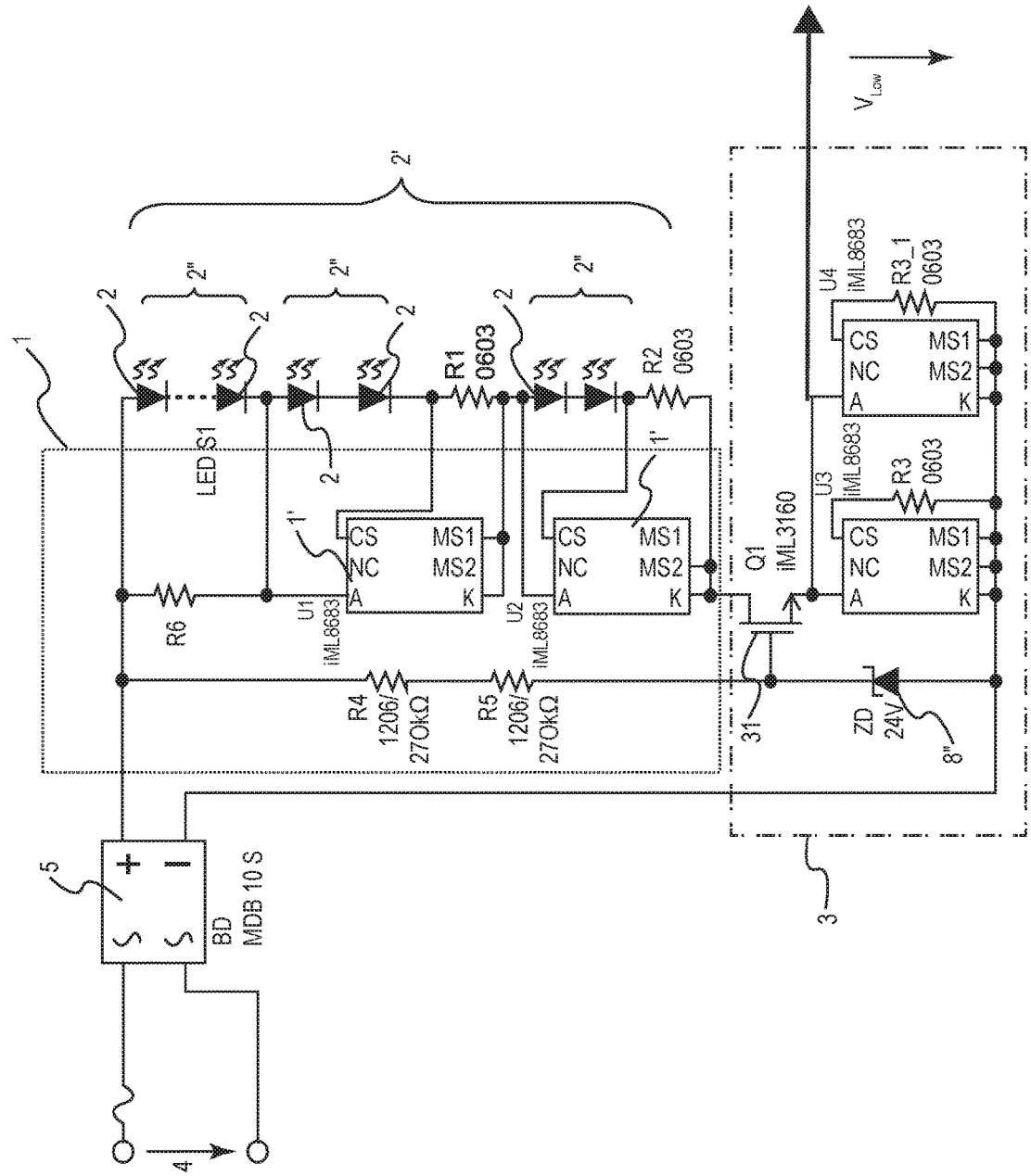
FIG. 8 shows a third exemplary embodiment of a direct AC driving unit according to the invention.

In FIG. 8, a second exemplary embodiment of a direct AC driving circuit according to the invention is shown. In contrast to FIG. 4 or FIG. 5, the embodiment according to FIG. 8 provides a low voltage $V_{low}$ in dependence on a further regulation means, here in form of a zener diode 8" as a preset voltage for the constant current regulation unit 3 and the current switch 31. Instead of the zener diode ZD, a further LED-string 8' according to the above-described embodiments of the invention can be used to set the low voltage $V_{low}$.

According to FIG. 8, the current control unit 3 comprises a transistor as current control switch 31 in order to limit as current through the LED-string 2'. Whenever the current switch 31 starts to close, the respective low voltage $V_{low}$ is used to charge a capacitor (not shown) in order to use the unutilized voltage.

Furthermore, the LED-shortening units 1' are shown as integrated circuits U1 and U2. The LED-string 2' is divided into three LED-substrings 2" comprising a different number of series-connected LEDs 2 to adjust the direct AC driving circuit according to the desired lighting application. Each LED shortening unit 1' is configured to shorten at least one LED-substrings 2".

Figure 9:
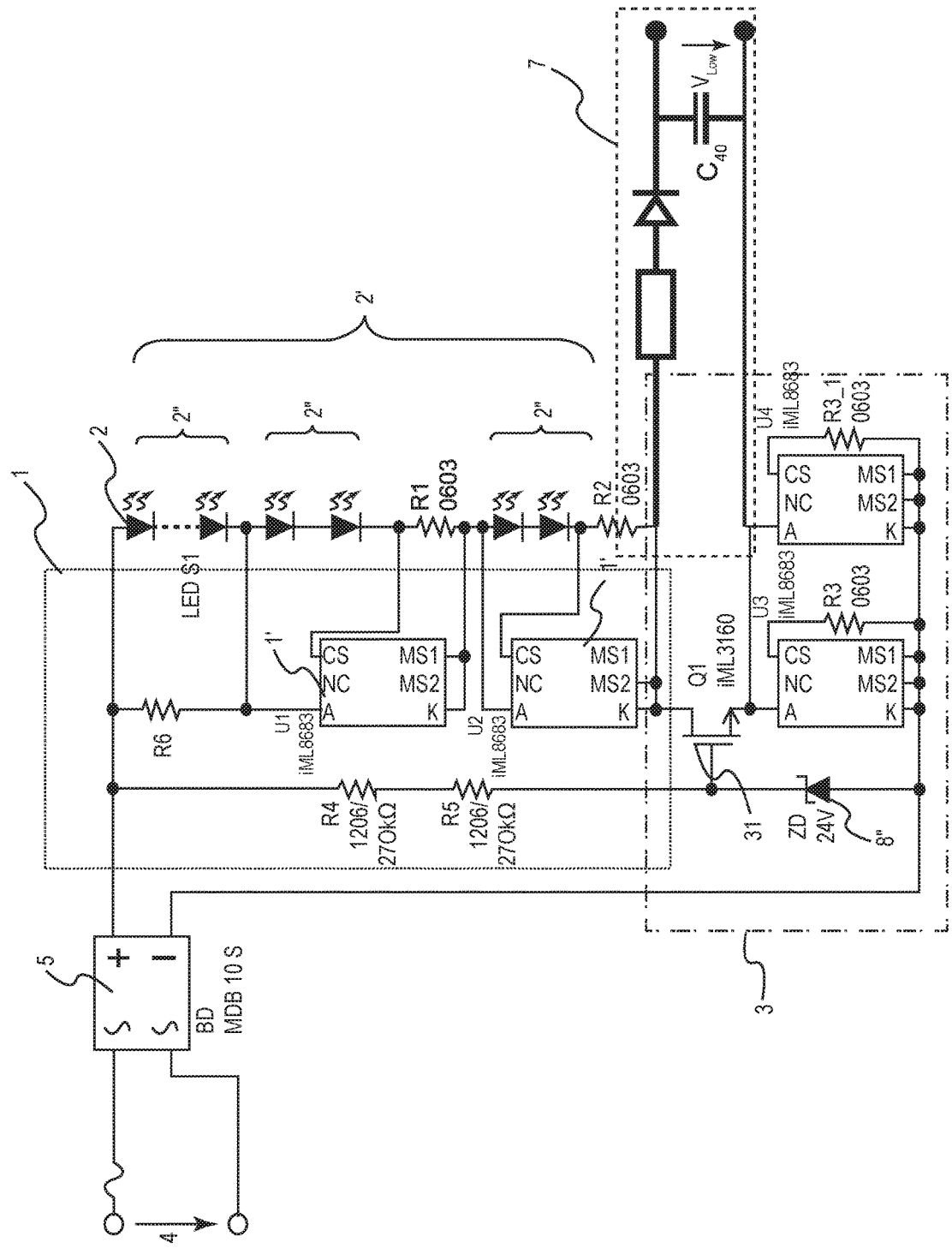
FIG. 9 shows a fourth exemplary embodiment of a direct AC driving unit according to the invention.

In FIG. 9, another exemplary embodiment of an AC driving circuit is shown. Herein, the buffer capacitance C40 of the low voltage power supply 7 is arranged in parallel to the current switch 31 of the current control unit 3. In case the voltage of the AC mains exceeds a preset voltage value, the current switch 32 starts to close. During this closing-period the capacitor C40 starts charging to provide the low voltage $V_{low}$. The preset voltage value is adjusted by the Zener diode 8" as an example of a further regulation means 8. Alternatively, a further LED-string 8' can be used to preset the voltage value of the current regulation unit 3. Within this arrangement, the unutilized voltage according to region 63 can be used to provide a low voltage $V_{low}$.

Figure 10:
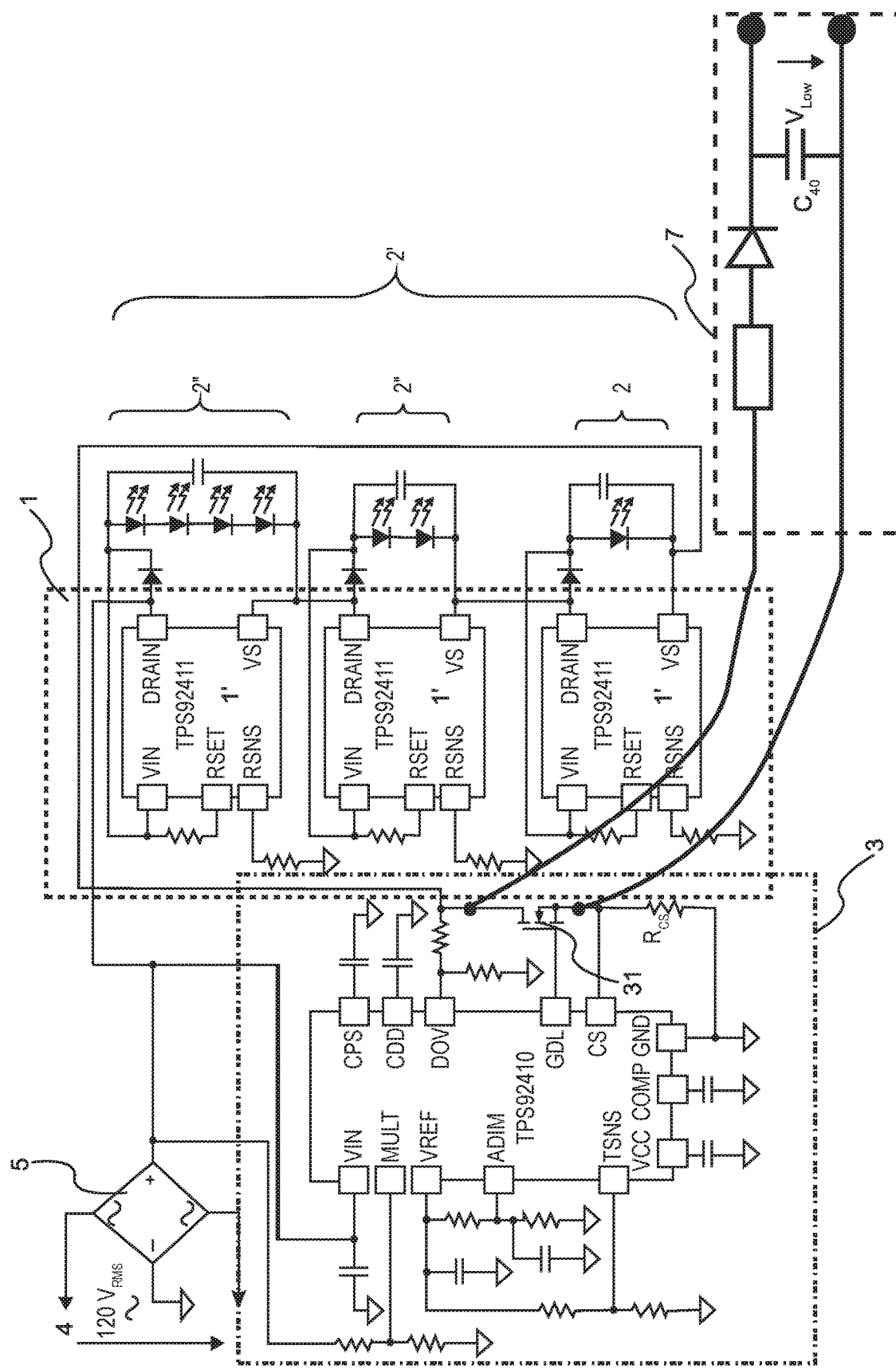
FIG. 10 shows a fifth exemplary embodiment of a direct AC driving circuit according to the invention.

In FIG. 10 another exemplary embodiment of a direct AC driving unit is shown. Herein, the current control unit 3 is provided as an integrated circuit that allows the utilizing of wasted power on all stages. According to FIG. 3, the use of this direct AC driving circuit uses all unutilized voltage of regions 61, 62 and 63 to provide the low voltage $V_{low}$. Thus, the power loss of a direct AC driving circuit is drastically reduced. This circuit allows the provision of low voltage $V_{low}$ with current of approximately 60 Milliamperes and a root-mean-square voltage of 3.3 Volts also in a dimming state.

Figure 11:
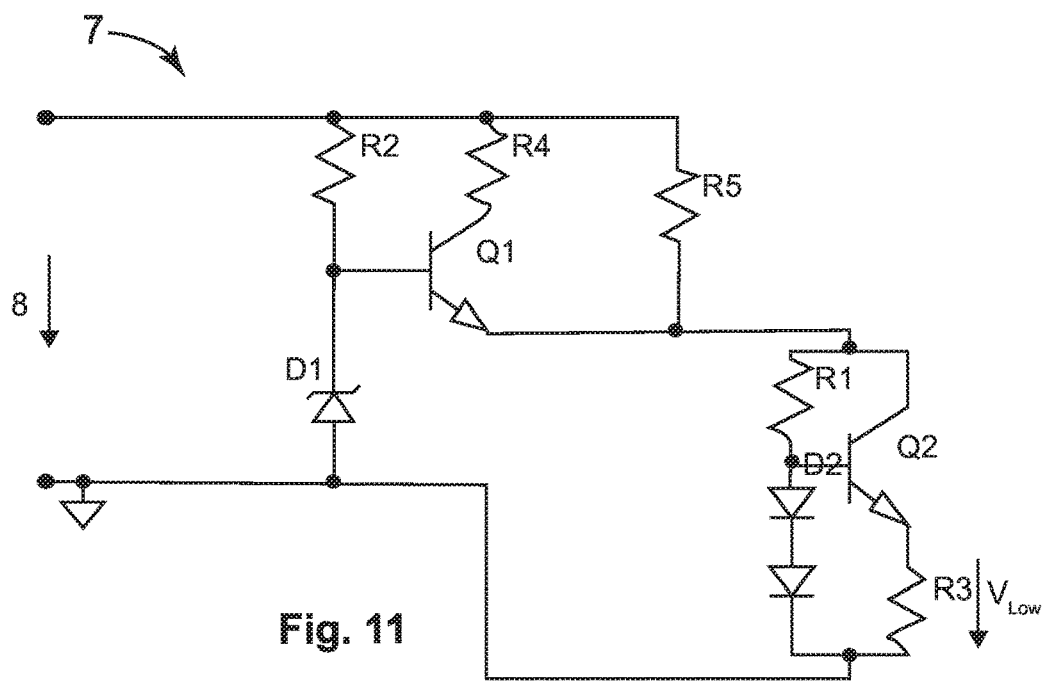
FIG. 11 shows a fourth exemplary embodiment of a low supply voltage circuit according to the invention.
Figure 12:
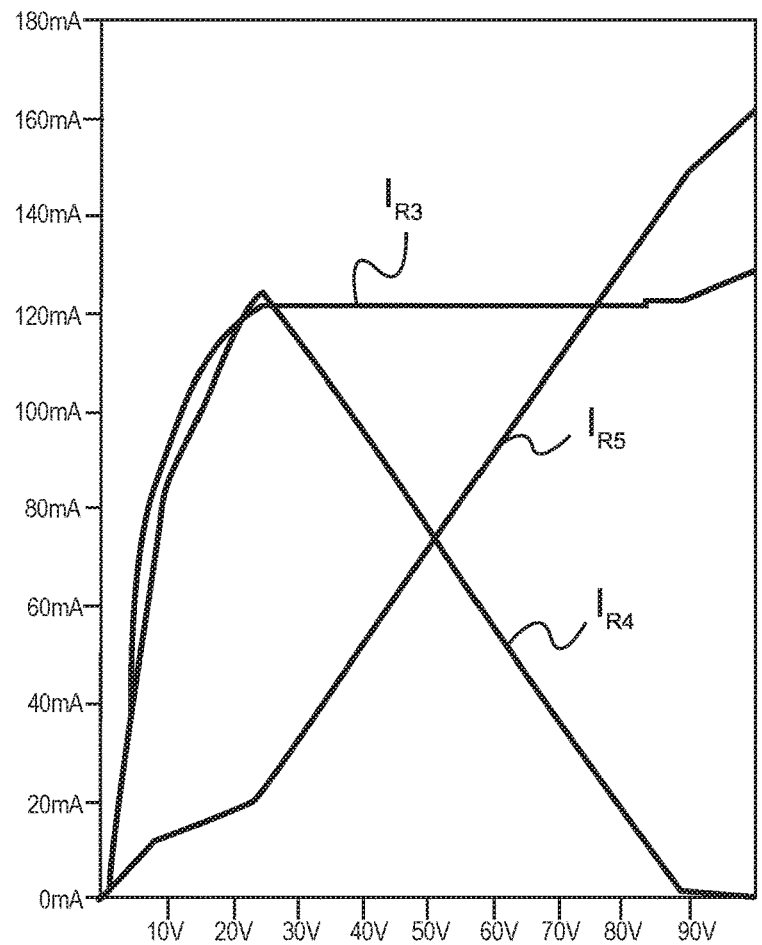
FIG. 12 shows exemplary current-voltage diagrams of a low supply voltage circuit according to FIG. 11.

In FIG. 11, a fourth exemplary embodiment of a low voltage power supply 7 is shown. In combination with FIG. 12, it is shown that the current $I_{r3}$ through the resistor R3 provides a highly linear current of 120 Milliampere within a range of 20V to 80V of rectified AC mains voltage 4. The height of the current is adjusted with the diode D2 and the resistor R1. Additionally, the LED string 8' (not shown) can provide a higher forward voltage $V_f$ to further increase the current $I_{r3}$. Using such an embodiment in a direct AC driving unit according to FIG. 10, all unutilized voltage can be used to provide the low voltage $V_{low}$.

Figure 13:
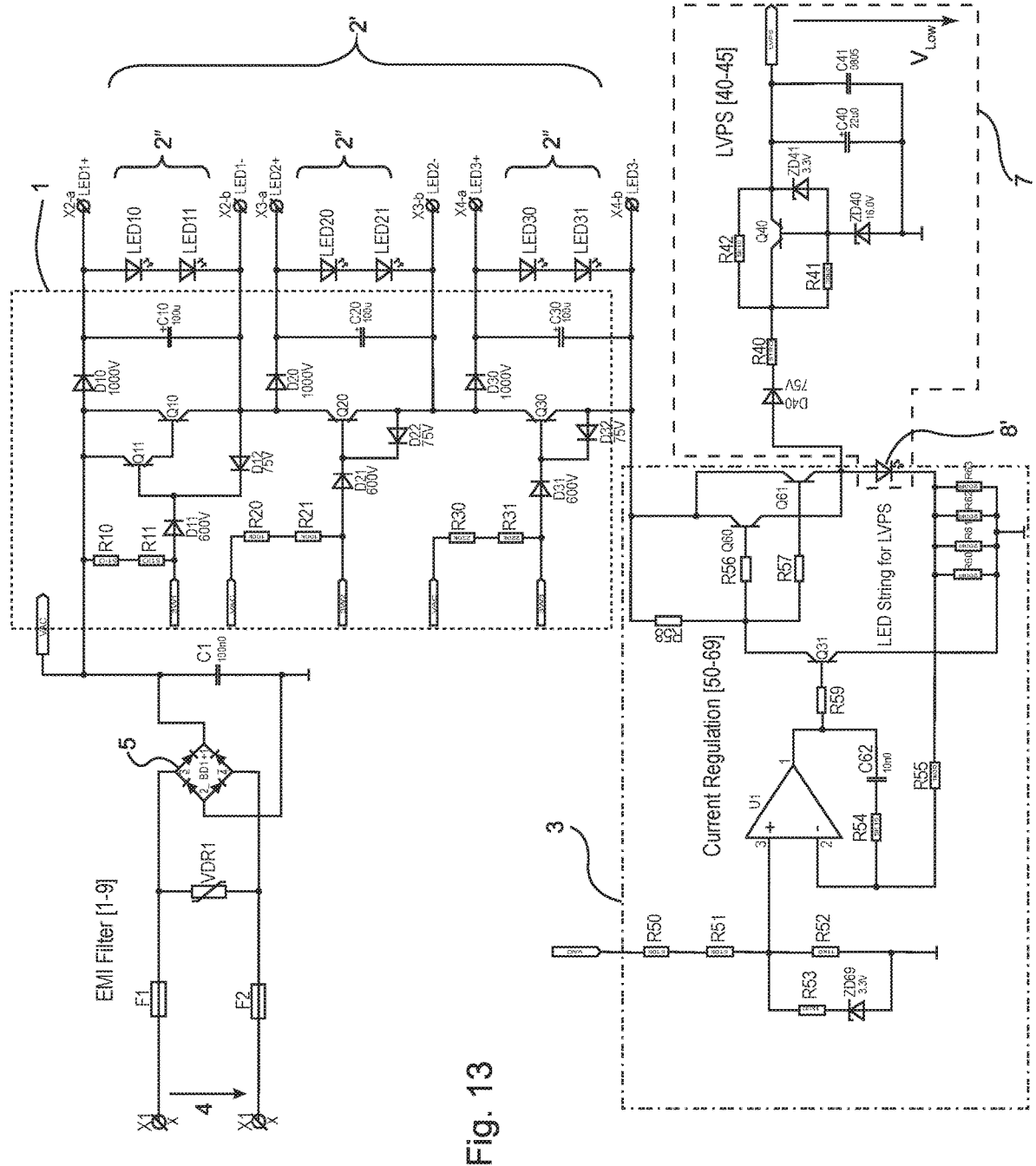
FIG. 13 shows a sixth exemplary embodiment of a direct AC driving unit according to the invention.

In FIG. 13, another exemplary embodiment of a direct AC driving circuit is shown. Therein, the current control unit 3 is built with an operating amplifier that provides a highly stabilized output voltage $V_{low}$. In such a scenario, the low voltage $V_{low}$ can be applied to a multi-point control unit or can be applied to a dimming or smart control that requires typically more than 3 Milliampere of current.

Figure 14:
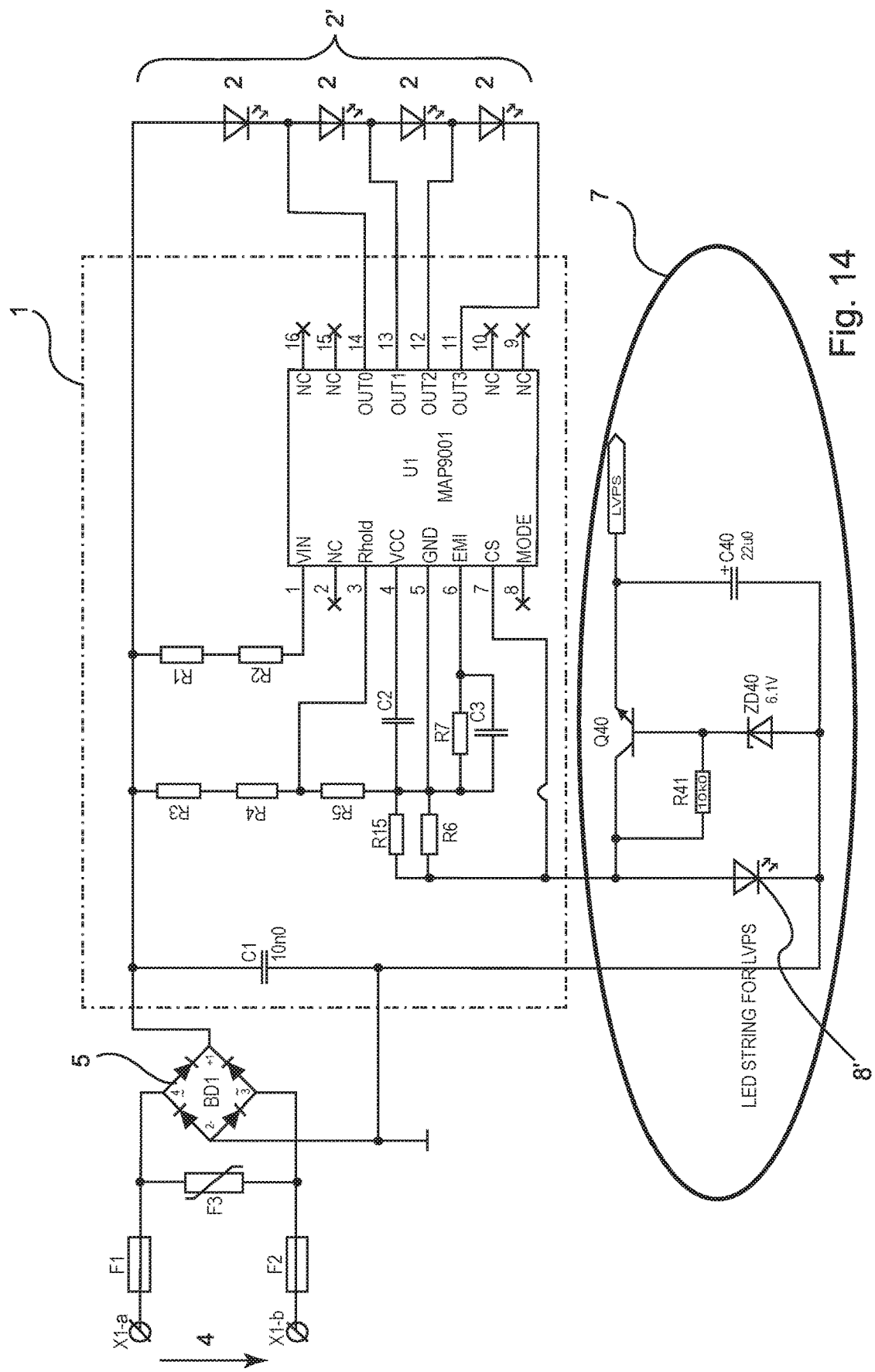
FIG. 14 shows a seventh exemplary embodiment of a direct AC driving circuit according to the invention.

In FIG. 14, another exemplary embodiment of a direct AC driving unit is shown. In contrast to the above-described embodiments, the further LED string 8' is applied to a supply voltage input VCC of the integrated circuit U1. Using the further LED string 8' in this arrangement, leads to a longer LED-string low voltage conduction time and thus makes the resulting low voltage $V_{low}$ more stable. Thus, the size of the capacitance C40 can be reduced.

In FIG. 15, a prior art buck regulator is shown that is used to further stabilize the output voltage $V_{low}$ of the direct AC driving circuit.

The provided low voltage power supply 7 can be used as a supply for a multipoint-control unit or can be used for supplying a 1-10 Volts dimming arrangement or a PWM dimming arrangement or any other kind of control such as a corridor function, air-fan, motion sensor and so on. The corridor function means that upon detection of an activity of a monitored area (staircase, corridor) the lighting means are dimmed to an operation of 100% dim level. After a certain deadtime period, after the last detection of an activity (presence, movement, etc.) the lighting means are then dimmed to a non-zero level of e.g. 10% dimming. Using the low voltage leads to an energy system in which the only necessary voltage is the AC mains voltage 4 that is applied to an AC mains input terminal and thus provides all subsequent low voltages $V_{low}$ with a high amount and a high increase of efficiency.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

What is claimed is:

1. A direct AC driving circuit for driving at least one LED, the driving circuit comprises:
    an LED-string that comprises a series connection of at least two LEDs, wherein the LED-string is directly powered from a rectified AC mains voltage; and
    an LED-string switching unit that is configured to control at least one LED-shorting unit that is arranged in parallel to at least one LED of the LED-string; and
    a low voltage power supply for providing a low supply voltage which is derived from the rectified AC mains voltage and is generated from unutilized voltage of the LED-string; wherein the low power supply includes a capacitor that is charged from unutilized voltage exceeding the sum of forward voltages of activated LEDS in the LED-string, and wherein the low supply voltage is derived from a further regulation means that is connected in series to the LED-string and that is independent of the LED-string switching unit.

2. The driving circuit according to claim 1, wherein the low supply voltage is generated from a voltage lower than a forward voltage of the LED-string.

3. The driving circuit according to claim 1 wherein the low supply voltage is provided by the capacitor that is charged from a voltage that exceeds a damaging voltage and/or the sum of forward voltages of activated LEDs in the LED-string.

4. The driving circuit according to claim 1, wherein the further regulation means is another LED or a Zener diode.

5. The driving circuit according to claim 1, wherein the further regulation means comprises another LED-string, wherein the value of the low supply voltage is adjusted by the number of LEDs arranged in the additional LED-string.

6. A direct AC driving circuit for driving at least one LED, the driving circuit comprises:
    an LED-string that comprises a series connection of at least two LEDs, wherein the LED-string is directly powered from a rectified AC mains voltage; and
    an LED-string switching unit that is configured to control at least one LED-shorting unit that is arranged in parallel to at least one LED of the LED-string; and
    a low voltage power supply for providing a low supply voltage which is derived from the rectified AC mains voltage and is generated from unutilized voltage of the LED-string; wherein the low power supply includes a capacitor that is charged from unutilized voltage exceeding the sum of forward voltages of activated LEDS in the LED-string, and wherein the low supply voltage ($V_{Low}$) is derived from a current control unit that is used to adjust the current flow through the LED-string.

7. The driving circuit according to claim 6, wherein the current control unit at least comprises a current control switch that is switched in dependence on a further regulation means, wherein the capacitor is arranged in parallel to the current control switch and wherein the capacitor is charged upon shortening of the current control switch.

8. The driving circuit according to claim 6 wherein the low supply voltage ($V_{Low}$) is fed to a buck regulator.

9. The driving circuit according to claim 6 wherein the LED-string comprises at least two LED-substrings, and each LED-substring is connected in parallel to a LED-shorting unit.

10. The driving circuit according to claim 6 wherein the low voltage supply is provided to a subsequent unit of the driving circuit, and wherein the subsequent unit comprises an active sensor or active actor.

11. The driving circuit according to claim 6 wherein the low voltage supply is used to power the LED-string switching unit.

12. The driving circuit according to claim 6 wherein the low voltage supply is used to supply a multi-point-control unit.

13. The driving circuit according to claim 6 wherein the low voltage supply is used to supply a dimming unit.

14. A luminaire for emitting light wherein the luminaire is built with at least one LED that is driven by a driving circuit according to claim 6 wherein the luminaire is directly applied to an AC mains voltage.

15. The luminaire according to claim 14, wherein the derived low supply voltage is used to supply a dimming unit, wherein the dimming unit adjusts a PWM-signal of the LED-string switching unit that is applied to the LED-shorting unit.

16. The luminaire according to claim 14 wherein the low supply voltage is used to supply a multipoint-control unit, wherein the multipoint-control unit sends and/or receives control commands to the LED-string switching unit.

17. A lighting system for building comprising at least one luminaire according to claim 14 wherein the lighting system at least comprises an active sensor, an actor and/or a multipoint control unit that is supplied by a low supply voltage derived from the driving circuit.

* * * * *